(12) United States Patent
Rasal

(10) Patent No.: US 8,031,687 B2  
(45) Date of Patent: Oct. 4, 2011

(54) OPTIMIZED USAGE OF ACCESS TECHNOLOGY IN A MULTI-MODE ARCHITECTURE

(75) Inventor: Digambar L. Rasal, Ribandar (IN)

(73) Assignee: Kyocera Corporation, Kyoto (JP)

(*) Notice: Subject to any disclaimer, the term of this patent is extended or adjusted under 35 U.S.C. 154(b) by 910 days.

(21) Appl. No.: 11/777,844

(22) Filed: Jul. 13, 2007

(65) Prior Publication Data

US 2009/0016310 A1   Jan. 15, 2009

(51) Int. Cl.  
*H04B 7/212* (2006.01)

(52) U.S. Cl. ............ 370/342; 455/553.1; 455/435.2; 455/425

(58) Field of Classification Search ........ 455/432.1, 455/432.3, 435.1, 435.3, 443, 444, 452.2, 455/41.2, 512–514, 115.3, 127.4, 134, 135; 370/42, 344, 347, 338, 342  
See application file for complete search history.

(56) References Cited

U.S. PATENT DOCUMENTS

| | | | |
|---|---|---|---|
| 6,829,481 B2 | 12/2004 | Souissi | |
| 2002/0119757 A1* | 8/2002 | Hamabe | 455/69 |
| 2003/0043773 A1 | 3/2003 | Chang | |
| 2004/0203745 A1* | 10/2004 | Cooper | 455/432.1 |
| 2004/0209615 A1 | 10/2004 | Lamb et al. | |
| 2005/0020286 A1 | 1/2005 | Lazaridis et al. | |
| 2005/0037755 A1* | 2/2005 | Hind et al. | 455/435.3 |
| 2005/0059397 A1* | 3/2005 | Zhao | 455/435.2 |
| 2005/0083899 A1* | 4/2005 | Babbar et al. | 370/342 |
| 2007/0076665 A1* | 4/2007 | Nair et al. | 370/335 |

FOREIGN PATENT DOCUMENTS

| | | |
|---|---|---|
| JP | 2000-332642 | 11/2000 |
| JP | 2004-080707 | 3/2004 |

* cited by examiner

*Primary Examiner* — Jinsong Hu  
*Assistant Examiner* — Michael Nguyen

(57) ABSTRACT

Embodiments of the present invention are directed to optimized usage of access technology in a multi-mode architecture. By optimizing usage of access technology in a multi-mode architecture, the handset can utilize the most effective access technology for the application or it can utilize multiple access technologies for multiple applications.

20 Claims, 7 Drawing Sheets

OPTIMIZED USAGE OF ACCESS TECHNOLOGY IN A MULTI-MODE ARCHITECTURE

FIELD OF THE INVENTION

The present invention is directed to cellular telecommunications using a multi-mode architecture.

BACKGROUND

Code division multiple access (CDMA) is one example of an access technology. CDMA is a form of multiplexing and a method of multiple access that divides up a radio channel not by time (as in time division multiple access), nor by frequency (as in frequency-division multiple access), but instead by using different pseudo-random code sequences for each user. CDMA is a form of "spread-spectrum" signaling, since the modulated coded signal has a much higher bandwidth than the data being communicated.

Recently, handsets that operate in a CDMA architecture have been developed with the ability to operate using a second architecture as well, called a multi-technology handset (or a handset operating in a multi-mode architecture). Examples of the second architecture that the multi-technology handset might use include wireless fidelity (WiFi), worldwide interoperability for microwave access (WiMAX), global system for mobile communications (GSM), or any other suitable over the air technology.

An application is software or sets of instructions that are designed and written to solve a particular problem. One application may implement a call feature on the handset. Another application may allow the handset to send a text message using a wireless application protocol. Another application may allow access to the Internet in order to stream data to the handset.

A multi-technology handset typically has a number of applications capable of running on it at any given time regardless of the type of access technology (i.e., CDMA, GSM, WiFi, WiMAX, etc). Current technologies, however, do not allow the handset to choose the access technology based on the type of application.

For example, when a streaming application is running on the handset, it needs the best possible data rates to operate maximally. However, if the handset access technology is currently CDMA, it might make the streaming application stall multiple times and/or otherwise not operate in the most efficient manner. If the access technology is WiFi or WiMAX, however, the streaming application will run much more efficiently.

Current schemes use multiple communication links and the links can be selected, for example, based on the characteristics of the packets traversing the links. The selection based on packet characteristics, however, is not application specific. Moreover, current schemes do not teach any manner in which a handset can rank the access technologies based on the applications, nor a manner in which a user can modify the rankings. Therefore, what is needed is a system and method that reduces or overcomes these significant problems found in the current schemes as described above.

SUMMARY

Embodiments of the present invention are directed to optimized usage of access technology in a multi-mode architecture. By optimizing usage of access technology in a multi-mode architecture, the handset can utilize the most effective access technology for the application or it can utilize multiple access technologies for multiple applications at the same time.

In one embodiment, the multi-technology handset operates using CDMA and at least one second access technology. The second access technology can be wireless fidelity (WiFi), worldwide interoperability for microwave access (WiMAX), or global system for mobile communications (GSM), for example. The multi-technology handset includes an application logic module that works in conjunction with an application data structure. The application logic module sets up the application data structure to store information about the usage characteristics of each application that the handset can run. In one embodiment, the user is capable of adding to the application data structure.

In one embodiment, the application data structure maintains information about the network bandwidth the application requires, the cost involved with the access technology, the reliability of the access technology, the fault tolerance of the access technology, the duration of usage, the frequency of usage, prior user behavior with respect to the access technology, prior handset behavior with respect to the access technology, and the current availability of the access technology. During system initialization, the application data structure can be initialized to have default values.

In operation, the handset runs the application. The application logic module uses the application data structure to determine the highest ranked access technology for the application. If the access technology is available, the application logic module instructs a controller in the handset to register with that technology. If the access technology is not available, the handset is instructed to register with the next highest ranked technology. In one embodiment, the user can override the rankings of the application logic module either for the current application's use of the access technology or every time the application needs to connect to one of the access technologies.

As the operation of the handset continues over time, the application logic module can continue to update the application data structure. For example, the rankings for the application can change as usages of different access technologies, usage times, frequencies, reliabilities, and costs change. If any service fault occurs, the application logic module can update the application data structure. The application logic module then can re-rank the access technologies for the application, for example by incrementing a fault count. This guarantees deterministic behavior while using the most appropriate access technology for each application.

Thus, each application runs on the handset in an appropriate environment, giving the user the best possible and most cost-effective service. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for optimized usage of access technology in a multi-mode architecture. For example, one method as disclosed herein allows for the multi-technology handset to utilize the most effective access technology based on the needs of the application or it can utilize multiple access technologies for multiple applications simultaneously.

After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
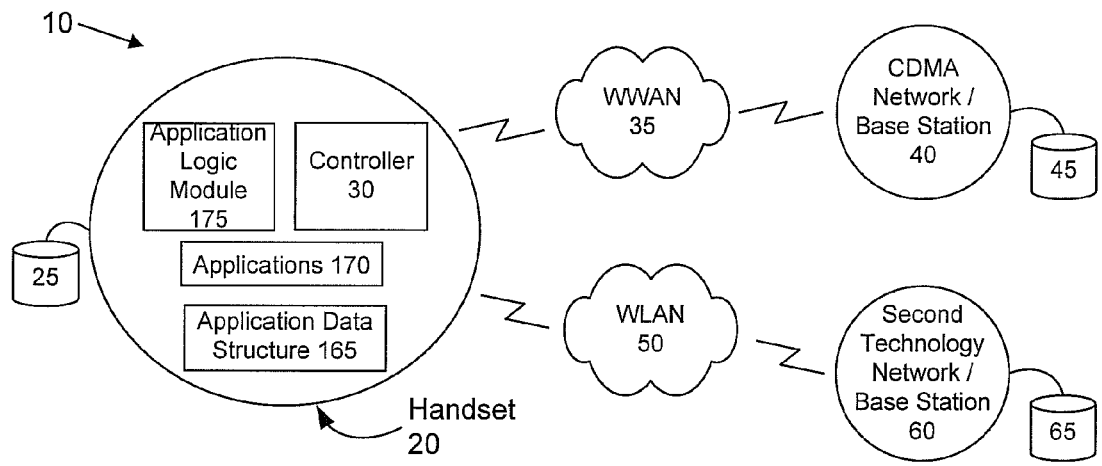
FIG. 1 is a network diagram illustrating an example multi-technology handset in communication in a multi-mode architecture including a CDMA network and a second technology network according to an embodiment of the present invention.

FIG. 1 is a network diagram illustrating an example multi-technology handset in communication in a multi-mode architecture including a CDMA network and a second technology network according to an embodiment of the present invention. In the illustrated embodiment, the system 10 comprises a multi-technology handset 20 (also referred to herein as a handset), a CDMA network 40, and a second technology network 60. The handset 20 and each of the networks 40 and 60 are configured with respective memory modules 25, 45, and 65.

The handset 20 is capable of being communicatively coupled with both the WWAN 35 and the WLAN 50. The WWAN 35 is configured for voice and data communications (e.g., with CDMA network 40) over a wide geographical area, for example using the CDMA communication scheme. The WLAN 50 is configured for voice and data communications (e.g., with second technology network 60) over a more limited geographical area, for example using one or more of the IEEE 802 communication standards such as 802.11 a/b/g. The WWAN 35 or the WLAN 50 can also be communicatively coupled with a public or private network (not shown), which may include that particular aggregation of networks commonly known as the Internet.

The handset 20 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network such as WWAN 35 and WLAN 50 either separately, simultaneously, or via multiple links across either the WWAN 35 or the WLAN 50 (e.g., if CDMA and GSM links are established at the same time).

The handset 20 includes a controller 30. The controller 30 is configured to send commands or instructions, which can generally cause the registration and/or de-registration with the CDMA network 40 and the second technology network 60.

The memory modules 25, 45, and 65 can be any sort of internal or external memory device and may include both persistent and volatile memories. The function of the respective memory modules 25, 45, and 65 is to maintain data for long-term storage and also to provide efficient and fast access to instructions for applications that are executed by the respective devices.

The handset 20 also includes applications 170, an application logic module 175, and an application data structure 165. Although the applications 170, the application logic module 175, and the application data structure 165 are shown as being a component of the handset 20, they may also be considered to reside in the memory module 25 of the handset 20.

The applications 170 include software or sets of instructions that are designed and written to solve a particular problem or provide some sort of benefit to the user. For example, one of the applications 170 can be configured to allow the user to use the handset 20 as a cellular phone to place and/or receive calls from other users. Similarly, another of the applications 170 can be configured to allow the user to download streaming videos, for example, via the Internet.

The application data structure 165 contains information about each of the applications 170. The information can include, for example, information about the network bandwidth the application requires across the WWAN 35 or the WLAN 50, the cost involved with the access technology (e.g., the CDMA network 40 or the second technology network 60), the reliability of the access technology, the fault tolerance of the access technology, the duration of usage, the frequency of usage, prior user behavior with respect to the access technology, prior handset behavior with respect to the access technology, and the availability of the access technology. The application data structure 165 can be in a number of forms capable of being accessed by a computer software, hardware, or firmware process, such as a table, a list, a stack, or the like.

The application logic module 175 works in conjunction with the application data structure 165. Initially, the application logic module 175 sets up the application data structure 165 to store information about the usage characteristics of each of the applications 170 that the handset 20 can run. In one embodiment, the user is capable of adding data to the application data structure 165. For example, the user may analyze the cost of using the various available access technology networks and may update the application data structure 165 accordingly.

In operation, the handset 20 begins to run one of the applications 170. The application logic module 175 accesses the data in the application data structure 165 to determine the highest ranked access technology. If the access technology is available, the application logic module 175 instructs the controller 30 in the handset 20 to register with that technology. If the access technology is not available, the handset 20 is instructed to register with the next highest ranked technology. The determination of the ranking by the application logic module 175 can occur at any time, but typically it occurs after the initiation of runtime.

Depending on the reliability factor indicated in the application data structure 165, unreliable access technology usage can be restricted if required. For example, in the case of 911 calls where the second technology network 60 is WiFi, it may not be reliable to use that network. The CDMA network 50, however, may be reliable. In this case, the application data structure 165 may contain data entries that indicate to the application logic module 175 that the CDMA network 40 should be ranked highest. However, if CDMA network 40 is not available the next highest ranked access technology can still be used.

Similarly, there are situations where the application 170 is media centric. For example, the media centric application may allow the user to connect to a media server in order to download and play audio or video files. For the media centric application, using the CDMA network 40 may not be suitable, as the CDMA network 40 may not cater to the data bandwidth requirements of the media centric application. However, if the second technology network 60 is a WiFi network and WiFi is used, it can provide 54 megabits per second under ideal conditions. WiFi, therefore, can provide optimal speed for the application, which can cause the application logic module 175 to rank the second technology network 60 highest.

In one embodiment, the user can override the rankings of the application logic module 175. For example, the application logic module 175 may determine from the application data structure 165 that the CDMA network 40 is ranked highest, but the user can override that ranking, thereby causing the controller 30 to initiate an acquisition and registering with the second technology network 60. The user override can operate for just this connection (e.g., for a single event) or the user can override the ranking every time a particular application 170 needs to access one of the networks (e.g., for all events).

As the user operates the handset 20 over time, the application logic module 175 can continue to update the application data structure 165. For example, the rankings of the application 170 can change as usages of different access technologies, usage times, frequencies, reliabilities, and costs change.

In one embodiment, the application logic module 175 maintains the ranking as a number associated with the application 170 for each available access technology (e.g., CDMA, WiFi, WiMAX, etc.) For example, with respect to a browser application, the application logic module 175 might maintain the following ranking (CDMA rank=5; WiFi rank=10; and WiMAX rank=25). In this example, a new connection by the browser application will be attempted on WiMAX. If the new connection to WiMAX fails, the application logic module 175 recalculates the rank. For example, the new rank can be (CDMA rank=5; WiFi rank=10; and WiMAX rank=24). Thereafter, the browser application will try to connect to the WiFi access technology.

Figure 2:
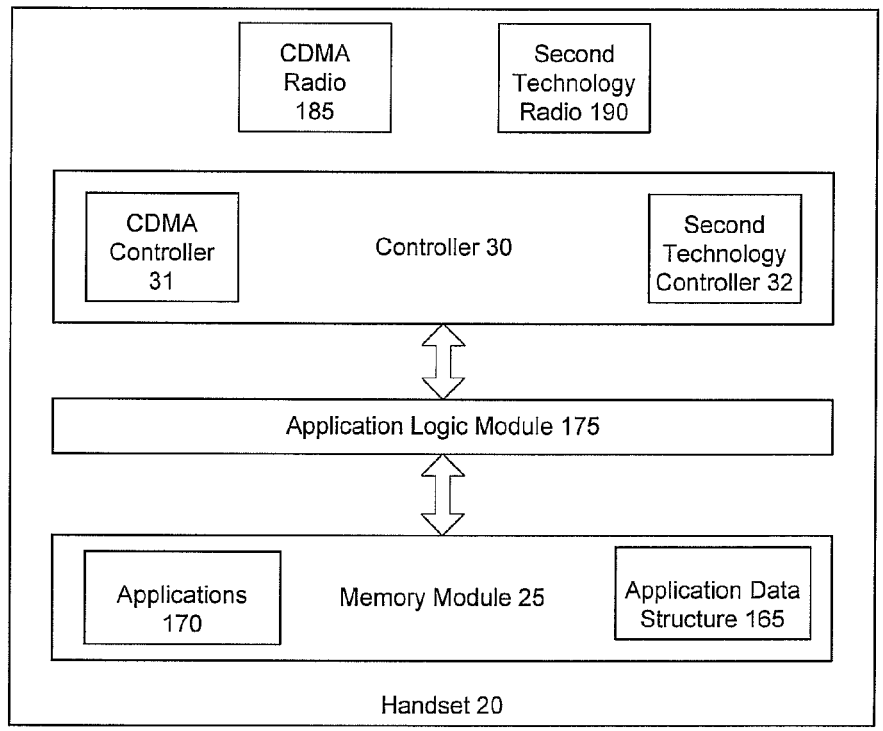
FIG. 2 is a block diagram illustrating an example multi-technology handset according to an embodiment of the present invention.

FIG. 2 is a block diagram illustrating an example multi-technology handset 20 according to an embodiment of the present invention. In the illustrated embodiment, the handset 20 comprises the controller 30, a CDMA controller 31, a second technology controller 32, a CDMA radio 185, a second technology radio 190, the application logic module 175, and the application data structure 165 as well as the applications 170 in the memory module 25. These various modules in the handset 20 can be implemented in software, hardware, or some combination of the two and are in communication with each other directly or indirectly through various inter-module interfaces.

It should be noted that many components that are included in the elements of FIGS. 1, 2, and the subsequent figures have been omitted to make the descriptions more clear. One will note that these omitted elements such as processors, network ports, memories, buses, transceivers, etc., would be included in such elements in a manner that is commonly known to those skilled in the art.

The application logic module 175 contains the logic or algorithms, which determine the ranking for each of the technologies available to the handset 20 for any given application. The application logic module 175 can take into account a number of criteria in order to rank the applications 170. The application logic module 175 can also set-up the application data structure 165 by adding data in association with a number of records or entries, for example in a table or a list. The application logic module 175 can further update the application data structure 165 over time as the user utilizes the handset 20.

For example, if a service fault occurs with respect to one of the applications 170 on the second technology network 60, the application logic module 175 can update an entry in the application data structure 165. Each time the handset 20 runs the same one of the applications 170, the application logic module 175 can re-rank the access technologies for the application. This may or may not result in the application logic module 175 determining a new ranking for the access technologies depending on a number of factors.

For example, the application logic module 175 may increment a fault count each time the service fault occurs with respect to the one of the applications 170 on the second technology network 60. Eventually, the fault count may be high enough that the application logic module 175 re-ranks the access technologies wherein the CDMA network 40 becomes highest ranked for that one of the applications 170.

Once the application logic module 175 ranks the access technologies, it causes the controller 30 to instruct the one of the access technology specific controllers (i.e., either the CDMA controller 31 or the second technology controller 32) to acquire and register with the second technology network 60 (i.e., to complete the communicative coupling with the second technology network 60) or to acquire and register with the CDMA network 40 (i.e., to complete the communicative coupling with the CDMA network 40).

If the highest ranked access technology cannot be acquired and registered to, the application logic module 175 can choose the next highest ranked technology and instruct the controller to acquire and register with that access technology accordingly.

In one embodiment, a plurality of the applications 170 can be communicatively coupled to the respective networks using different access technologies at the same time. For example, a user may be utilizing a voice channel with the CDMA network 40 (e.g., the user is talking to another user on the handset 20). At some point, one of the applications 170 may need to stream video or other data using the second technology network 60.

This scenario is becoming more common as the handset 20 may include multiple displays, more memory, and more media centric applications. In this scenario, the application logic module 175 may instruct the controller 30 to complete a communicative coupling to the second technology network 60 (e.g., to acquire and register with the second technology network 60) simultaneously with the voice call. This may include, for example, the application logic module 175 determining with respect to the need for streaming video or other data that the second technology network 60 is the highest ranked and the second technology network 60 may become highest ranked merely because of the fact that the CDMA network 40 is not available.

Figure 3:
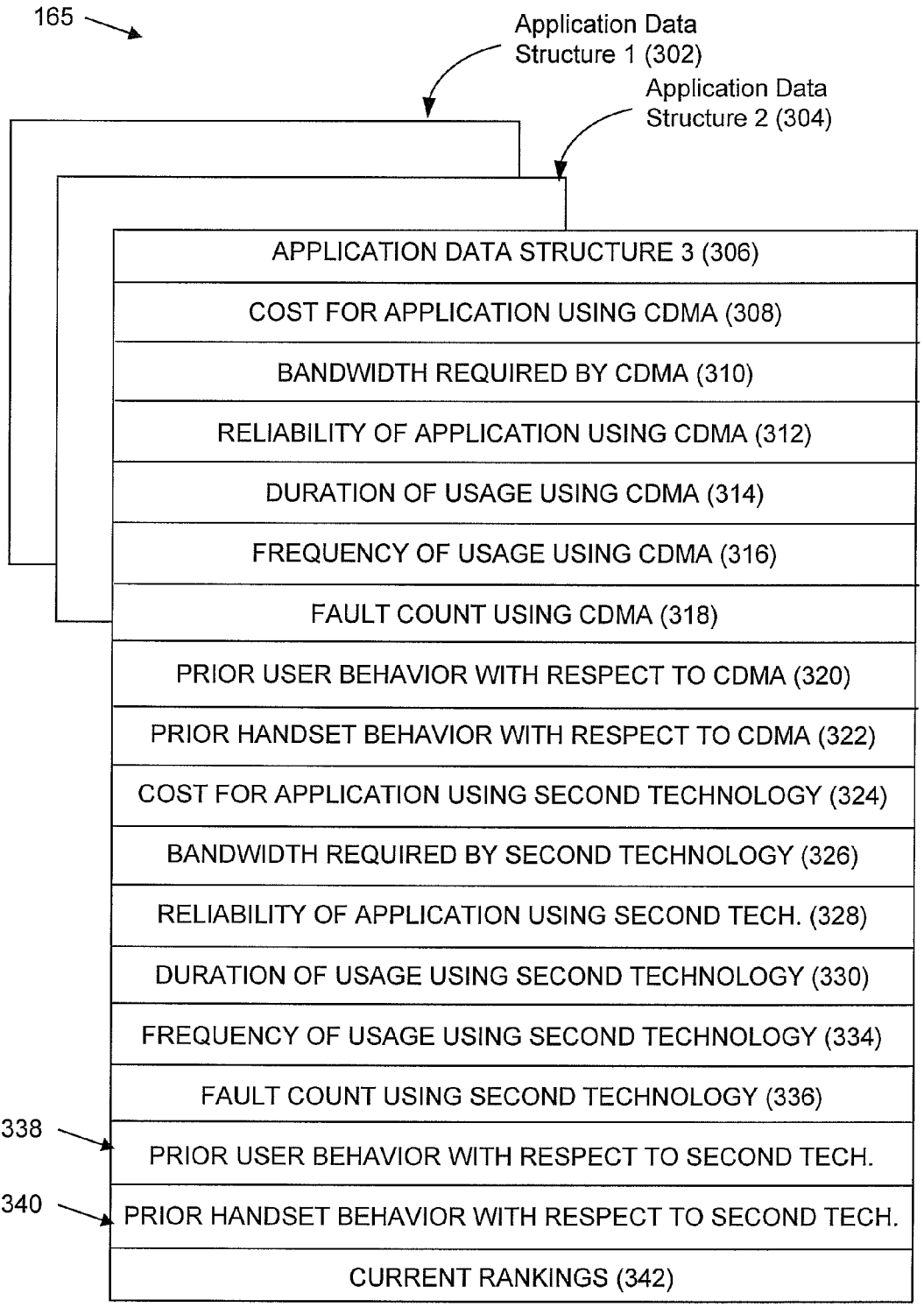
FIG. 3 is a diagram illustrating an example application data structure according to an embodiment of the present invention.

FIG. 3 is a diagram illustrating an example application data structure according to an embodiment of the present invention. The application data structure 165 in the example of FIG. 3 includes data structures for three applications 302, 304, and 306 in the form of tables. The data structure 306 for the third application is shown in greater detail. It should be noted that the handset 20 typically has many applications the number of which is only limited by the amount of memory included in the handset 20.

The data structure 306 for the third application is a table that includes a number of rows including rows for the cost for the application using CDMA as the access technology 308, the bandwidth required by CDMA 310, the reliability of the application using the CDMA technology 312, the duration of usage using the CDMA technology 314, the frequency of usage using the CDMA technology 316, the fault count using the CDMA technology 318, prior user behavior with respect to using the CDMA technology 320, prior handset behavior with respect to using the CDMA technology 322, the cost for the application using a second technology 324, the bandwidth required by the second technology 326, the reliability of the application using the second technology 328, the duration of usage using the second technology 330, the frequency of usage using the second technology 334, the fault count using the second technology 336, prior user behavior with respect to the second technology 338, prior handset behavior with respect to the second technology 340, and the current rankings 342.

The rows for the cost of the application using CDMA as the access technology 308 and the cost of the application using the second technology 324 can include data that the handset 20 updates periodically or it can be updated by the user. The rows for the bandwidth required by CDMA 310 and the bandwidth required by the second technology 326 can also be updated periodically by the handset 20. As these technologies change or the user moves geographically, these factors may change also so the corresponding entries in the application data structure 306 can change, which may in turn cause the rankings of these technologies to change.

The rows for the reliability of the application using CDMA as the access technology 312 and the reliability of the application using the second technology as the access technology 328 can include data that the handset 20 updates periodically. For example, if an existing application runs using CDMA and the application loses the link to the CDMA, the data in the row 312 can be updated to indicate that CDMA as the access technology for the present application is less reliable. On further uses of the application, this factor may cause the application logic module 175 to be less likely to rank CDMA as the highest ranked access technology.

Likewise, if an existing application runs using the second technology and the application loses the link to the second technology network 60, the data in the row 328 can be updated to indicate that the second technology as the access technology for the present application is less reliable. On further uses of the application, this factor may cause the application logic module 175 to be less likely to rank the second technology as the highest ranked access technology.

The rows for the duration of usage using the CDMA technology 314 and the duration of usage using the second technology 330 can include data that the handset 20 updates periodically. For example, if the user uses the second technology network 60 as the access technology 90 percent of the time, that could be indicative of a user preference for the second technology with respect to that application. In that case, the data in the row 330 can be updated to indicate that the second technology as the access technology for the present application is more preferable under this factor. On further uses of the application, this factor may cause the application logic module to be less likely to rank CDMA as the highest ranked access technology particularly if the duration of usage with respect to the second technology network 60 increases to more than 90 percent.

The rows for the frequency of usage using the CDMA technology 316 and the frequency of usage using the second technology 334 can include data that the handset 20 updates as the frequencies change over time. For example, if the user uses the second technology network 60 as the access technology more frequently, that could be indicative of a user preference for the second technology with respect to that application. In that case, the data in the row 334 can be updated to indicate that the second technology as the access technology for the present application is more preferable under this factor.

Similarly, if the user uses the CDMA network 40 as the access technology more frequently, row 316 can be updated as the frequency increases. Indications of frequency in the rows 316 and 334 may cause the application logic module to be more likely to rank the respective access technology as the highest ranked access technology.

The rows for the fault count using the CDMA technology 318 and the fault count using the second technology 336 can include data that the handset 20 updates as faults occur over time. The handset 20 can employ a dedicated fault counter for this purpose. For example, if the user uses the CDMA technology network 40 as the access technology and faults continually occur, that could be indicative of the CDMA network 40 not being suitable for the current application. In that case, the handset 20 updates data in the row 318 to indicate that the number of faults that have occurred has increased while the handset 20 is connected to the CDMA network 40.

The rows for the prior user behavior with respect to using the CDMA technology 320, prior handset behavior with respect to using the CDMA technology 322, prior user behavior with respect to the second technology 338, prior handset behavior with respect to the second technology 340 can include data that the handset 20 updates as user and handset behavior changes as the user uses the handset 20. This may include, for example, data indicating that the user prefers certain technologies over the other. The data in the rows 320, 322, 338, and 340 is used to cause the application logic module 175 to be more likely to rank the respective access technology as the highest ranked access technology.

The application logic module 175 can access the row for the current rankings 342 in order to choose the most appropriate access technology. As the data in the rows changes, the application logic module 175 may adjust the current rankings in the row 342 accordingly. Alternatively, row 342 may not be used and the application logic module 175 can calculate the rankings on the fly at runtime for each application 170.

During system initialization, the application data structure 165 can be initialized to have default values. It should be noted that the application data structure 306 for the third application is shown as using CDMA and a second technology but it is also possible for the handset 20 to use three or more technologies, such as CDMA, GSM, and WiFi for example. It is also possible for the handset 20 to use two technologies, one of which does not include CDMA, such as GSM and WiFi, for example. It is also not necessary that one of the technologies operate via a WWAN and one of the technologies operate via a WLAN. For example, the handset 20 can use both CDMA and GSM.

Figure 4:
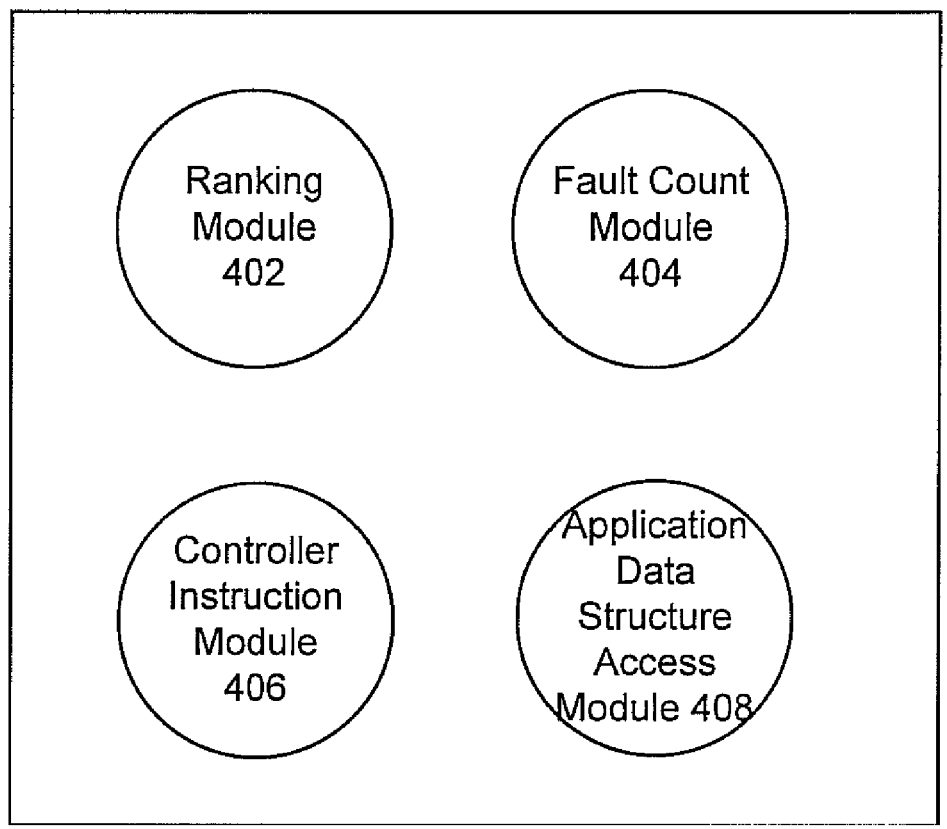
FIG. 4 is a block diagram illustrating an example application logic module according to an embodiment of the present invention.

FIG. 4 is a block diagram illustrating an example application logic module according to an embodiment of the present invention. The application logic module 175 includes a ranking module 402, a fault count module 404, a controller instruction module 406, and an application data structure access module 408.

The ranking module 402 is configured to perform a calculation that ranks the respective access technologies for the application 170. For example, in the case of the application data structure (306) of FIG. 3, the ranking module 402 may access the data in the rows of the table and it may perform a calculation to determine which technology is highest ranked.

The fault count module 404 is configured to determine when faults occur with respect to the various access technologies and to increment a fault count when the fault occurs. The fault count module 404 may include a counter that it increments each time the fault occurs and the value of the incremented fault counter can be added to the application data structure 165 so that next time the ranking module 402 ranks the access technology, the new fault count data can be used in the calculation.

The application logic module 175 uses the controller instruction module 406 to communicate with the controller 30 after the application logic module 175 determines which technology is ranked highest. For example, if the ranking module 402 determines that CDMA is the highest ranked access technology for the current application, the controller instruction module 406 communicates the information to the controller 30. The controller 30 in turn follows the instruction by causing the CDMA controller 31 to initiate an acquisition and registration process with the CDMA network 40.

Similarly, if the ranking module 402 determines that the second technology is the highest ranked access technology for the current application, the controller instruction module 406 communicates the information to the controller 30. The controller 30 in turn follows the instruction by causing the second technology controller 32 to initiate an acquisition and registration process with the second technology network 60.

The application logic module 175 uses the application data structure access module 408 to update the application data structure 165. For example, when the fault count module 402 increments a fault count with respect to one of the technologies, the application data structure access module 408 accesses the data structure and updates the values stored there.

Figure 5:
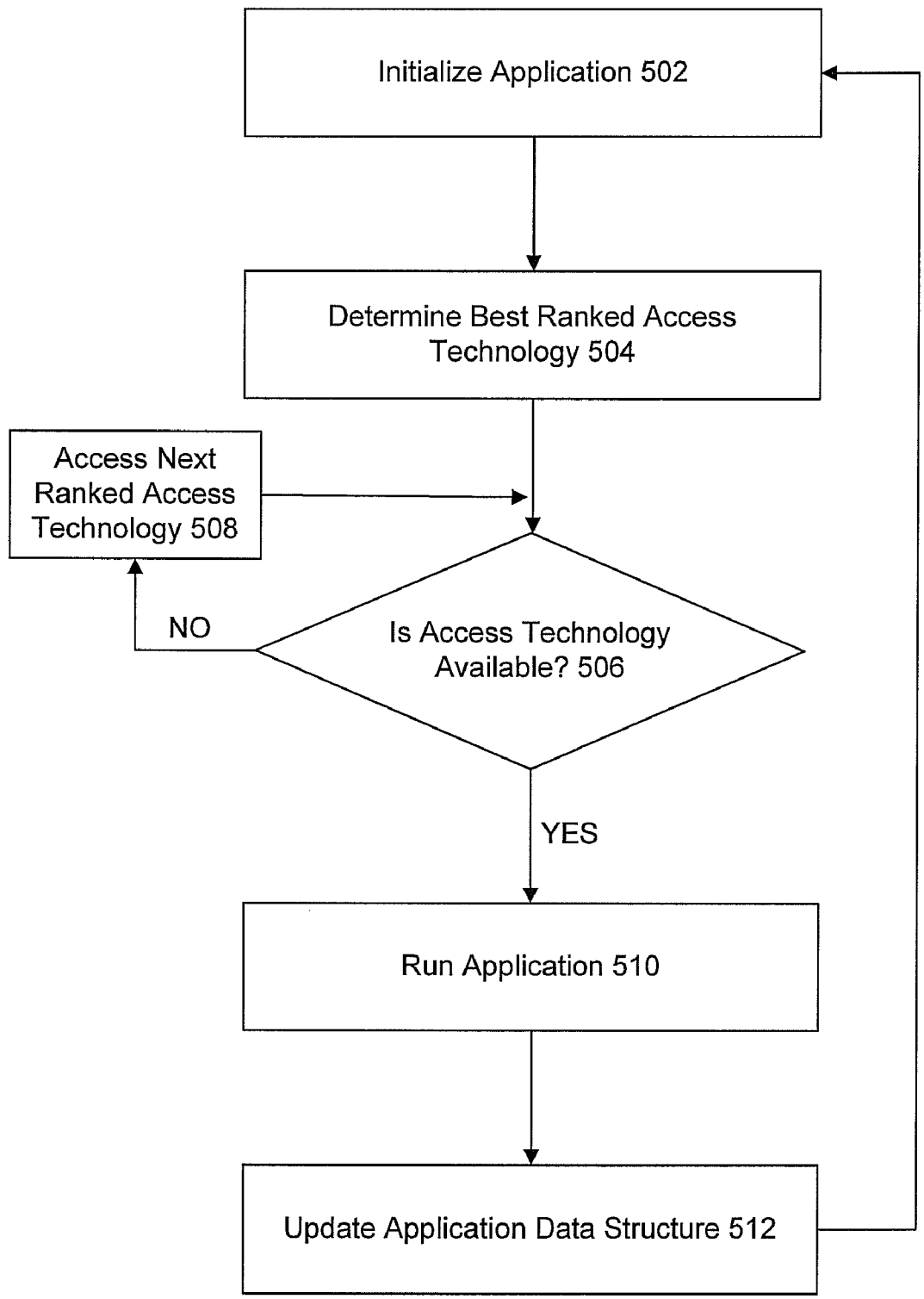
FIG. 5 is a flowchart illustrating an embodiment of a process implemented by the application logic module according to an embodiment of the present invention.

FIG. 5 is a flowchart illustrating an embodiment of a process implemented by the application logic module according to an embodiment of the present invention. The application logic module 175 carries out this process using a number of the modules illustrated in FIG. 4.

At step 502, the handset initializes the application. This may include, for example, loading the application from non-volatile memory to volatile memory. This may also include, for example, initiating the execution of the application. In another embodiment, the initialization of the application data structure 165 occurs when the handset is powered on and the application data structure is stored in non-volatile memory of the handset.

At step 504, the application logic module 175 determines the highest ranked technology. This may include evaluating the data associated with each of the factors in the application data structure 165 and performing a calculation to determine the highest ranked technology or merely accessing the initialized application data structure in the non-volatile memory.

At step 506, the handset determines whether the access technology is available. This may include, for example, the application logic module 175 instructing the controller to attempt to acquire the technology. The controller 30 in turn initiates the process of attempting to acquire the technology by communicating with the respective network and receiving a response from the network indicative of whether the network is available or not.

If the network is not available, the application logic module 175 causes the controller to attempt to acquire the next highest ranked technology at step 508. This may include, for example, the application logic module 175 accessing the application data structure 165 to determine the next highest ranked technology or the application logic module 175 performing a ranking calculation again.

Once an access technology is available at step 506, the application continues running at step 510 or otherwise completes its execution by performing the task for which it is designed. As the application 170 executes, the various factors in the application data structure 165 might become outdated. For example, the duration of usage and frequency of usage change depending on which technology the handset 20 accesses. If a fault occurs, the fault count would be incremented. Similarly, user behavior and reliability factors may change as the application 170 executes.

To that end, the application logic module 175 updates the application data structure 165 at step 512 and the process repeats as the handset 20 initializes each application. In another embodiment, the application logic module 175 updates the application data structure 165 every time the association between the handset and the access technology ends depending on the success or the failure to connect to he access technology.

Figure 6:
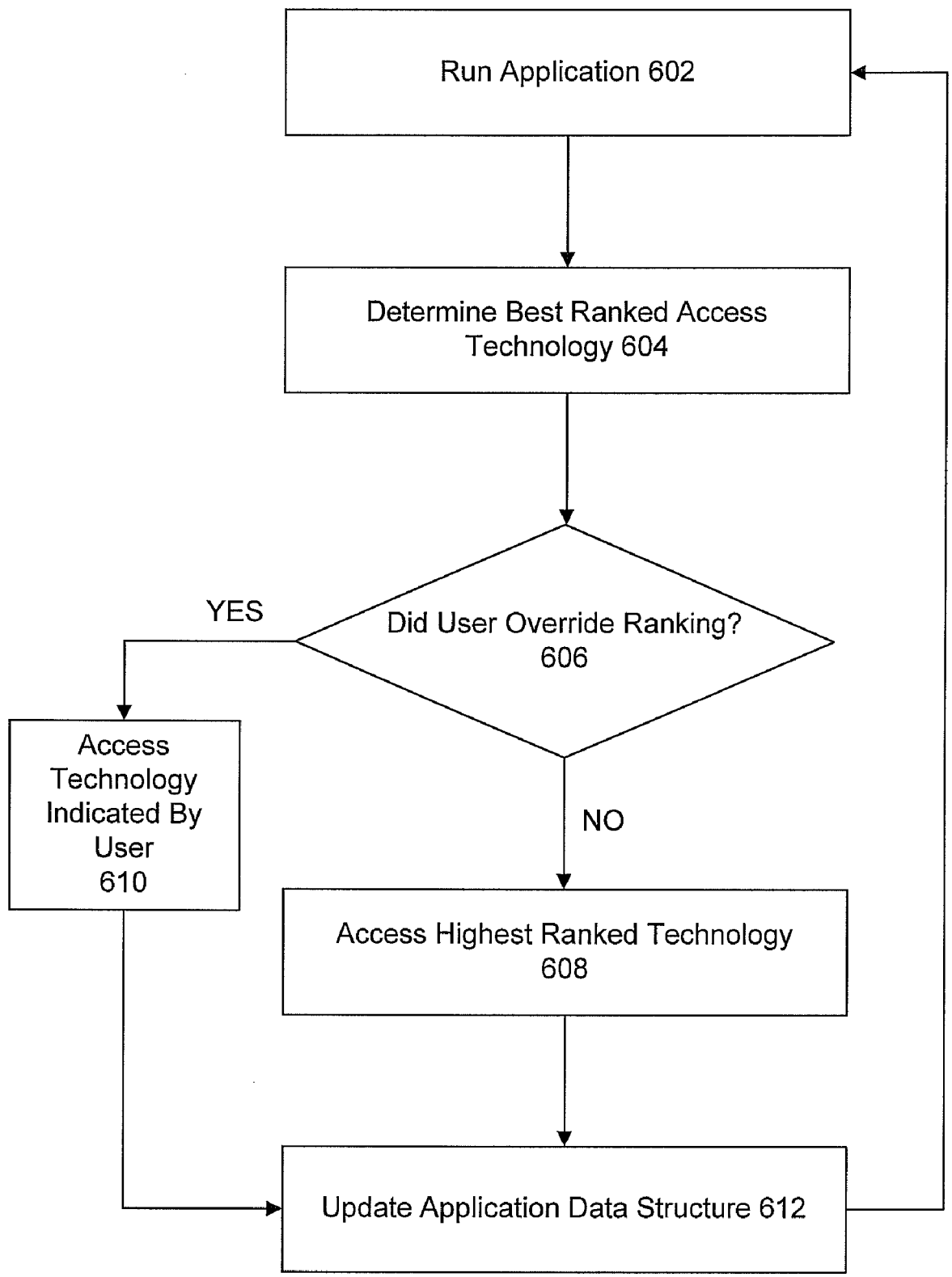
FIG. 6 is a flowchart illustrating an embodiment of a process implemented by the application logic module according to an embodiment of the present invention.

FIG. 6 is a flowchart illustrating an embodiment of a process implemented by the application logic module according to an embodiment of the present invention. The application logic module 175 carries out this process using a number of the modules illustrated in FIG. 4.

At step 602, the handset runs the application. This may include, for example, initiating the execution of the application in volatile memory. At step 604, the application logic module 175 determines the highest ranked technology. This may include evaluating the data associated with each of the factors in the application data structure 165 and performing a calculation to determine the highest ranked technology or merely accessing one of the rows in the application data structure 165 where the ranking has been previously computed and stored.

At step 606, the handset determines whether the user has overrode the ranking. This may occur explicitly with regard to the current event. For example, the handset may provide a prompt to the user and the user may indicate that they want to override the current access technology that is ranked the highest in favor of another access technology. Alternatively, the user may have previously overrode the ranking with respect to any and all events that occur with respect to the application 170.

If the user did not override the ranking, then at step 608 the handset 20 accesses the highest ranked technology. This may include, for example, the application logic module 175 instructing the controller 30 to attempt to acquire the technology. The controller 30 in turn initiates the process of attempting to acquire the technology by communicating with the respective network and receiving a response from the network indicative of whether the network is available or not.

If the network is available, the handset 20 registers with the network. If the user did override the ranking, however, at step 606, the handset performs the same process as in step 608, except with the access technology indicated by the user. Thereafter, in either case the application continues running or otherwise completes its execution by performing the task for which it is designed. As the application 170 executes, the various factors in the application data structure 165 might become outdated. To that end, the application logic module 175 updates the application data structure 165 at step 602 and the process repeats as the handset 20 runs each application.

Figure 7:
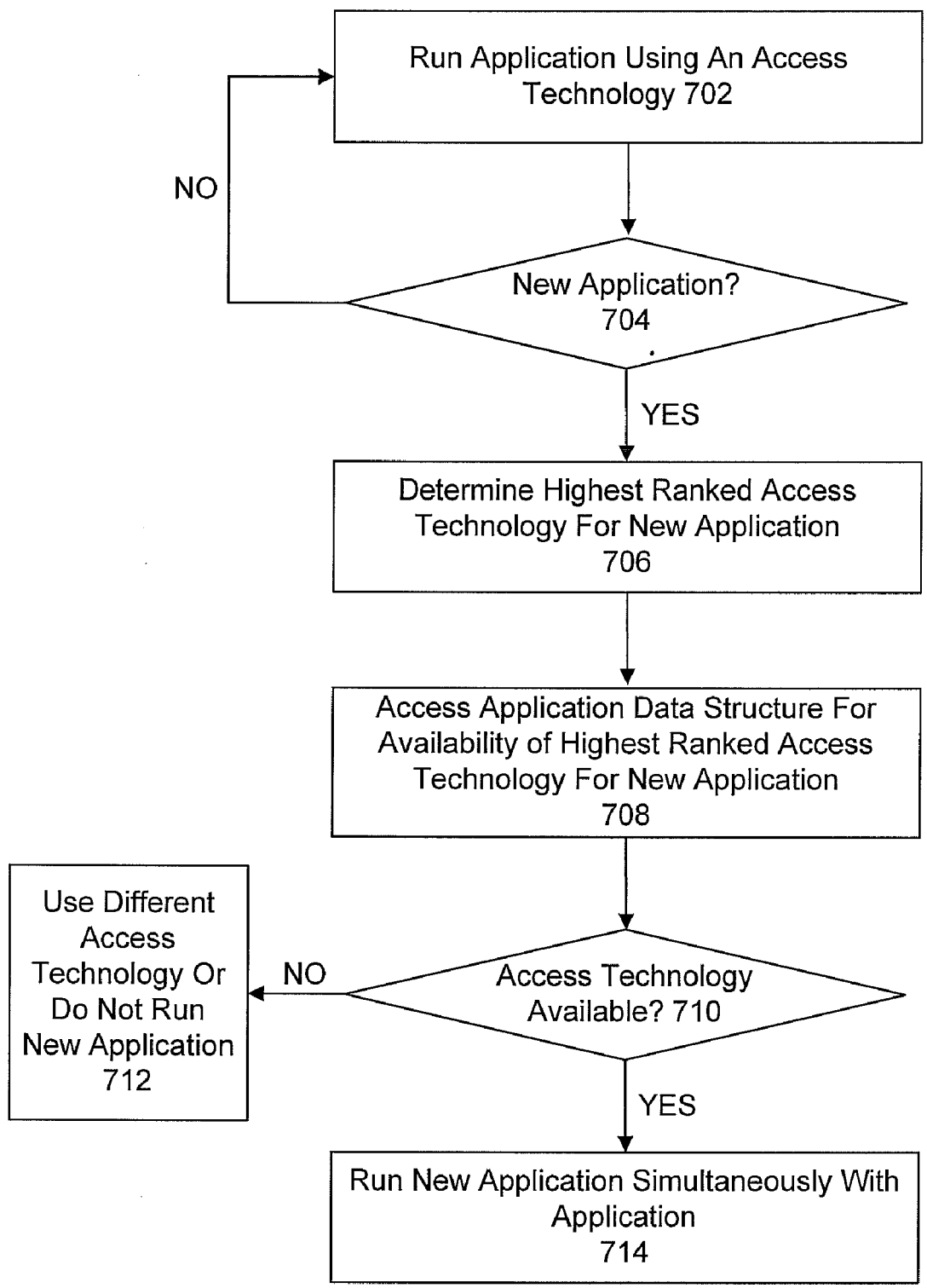
FIG. 7 is a flowchart illustrating an embodiment of a process implemented by the application logic module according to an embodiment of the present invention.

FIG. 7 is a flowchart illustrating an embodiment of a process implemented by the application logic module according to an embodiment of the present invention. The application logic module 175 carries out this process using a number of the modules illustrated in FIG. 4.

At step 702, the handset runs the application. This may include, for example, initiating the execution of the application in volatile memory. At step 704, the handset 20 determines whether a new application needs to run. If not, the process repeats at step 702.

If so, the application logic module 175 determines the highest ranked technology for the new application at step 706. This may include evaluating the data associated with each of the factors in the application data structure 165 and performing a calculation to determine the highest ranked technology or merely accessing one of the rows in the application data structure 165 where the ranking has been previously computed.

At step 708, the application logic module 175 accesses the application data structure 165 to determine whether the highest ranked access technology for the new application is available. This may include, for example, accessing a row in a table where there is data indicating whether the access technology is available. For example, if the application that is currently running at step 702 had previously accessed the technology and is still registered with the same technology, the application logic module 175 may have updated the application data structure 165 that such a resource was no longer available.

If so, then at step 710 the application logic module will determine that the access technology is not available. In this case, the handset 20 uses a different technology at step 712 or does not run the new application, for example, if no access technologies are currently available on the handset. Otherwise, the access technology is available at step 710 so the handset will run the new application simultaneously with the application at step 714.

Figure 8:
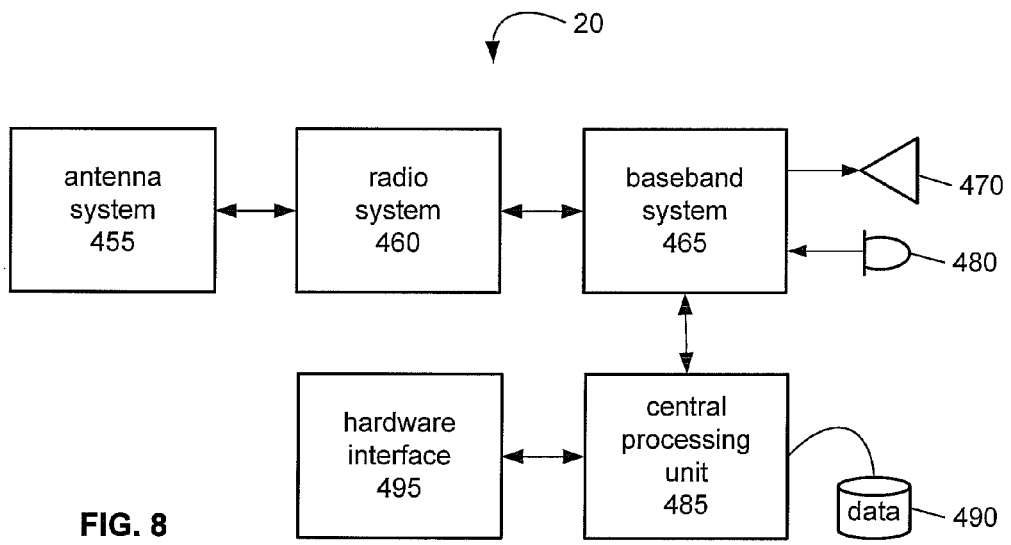
FIG. 8 is a block diagram illustrating an example wireless communication device that may be used in connection with various embodiments described herein.

FIG. 8 is a block diagram illustrating an example handset 20 that may be used in connection with various embodiments described herein. For example, the handset 20 may be used in conjunction with the application logic module 175 for generating and updating the application data structure 165 and for choosing the most appropriate access technology for any given application that executes on the handset 20. However, other wireless communication devices and/or architectures may also be used, as will be clear to those skilled in the art.

In the illustrated embodiment, handset 20 comprises an antenna system 455, a radio system 460, a baseband system 465, a speaker 464, a microphone 470, a central processing unit ("CPU") 485, a data storage area 490, and a hardware interface 495. In the handset 20, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the handset 20 to perform the various functions of the present invention as previously described. For example, data storage area 490 may include various software modules (not shown) that were previously described with respect to FIGS. 2 and 4.

In this description, the term "computer readable medium" is used to refer to any media used to provide executable instructions (e.g., software and computer programs) to the handset 20 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the handset 20. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the handset 20 include data storage devices, computing devices, headphones, microphones, and the like.

Figure 9:
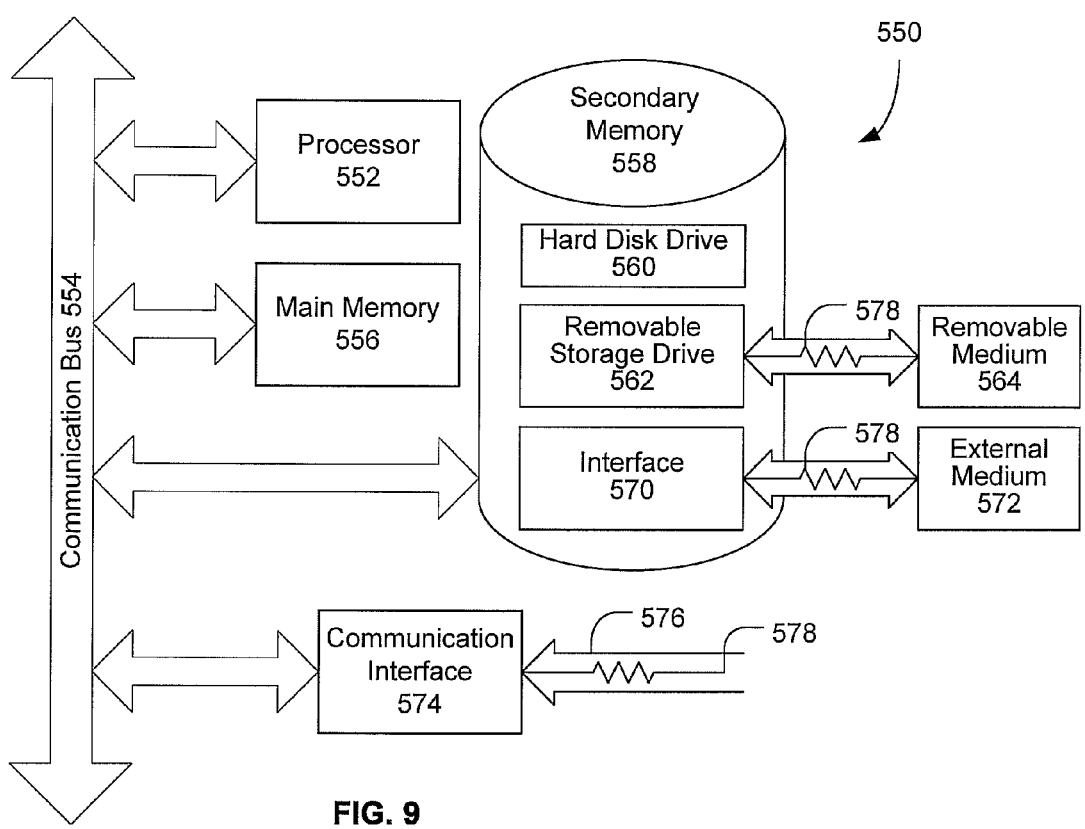
FIG. 9 is a block diagram illustrating an example computer system that may be used in connection with various embodiments described herein.

FIG. 9 is a block diagram illustrating an example computer system 550 that may be used in connection with various embodiments described herein. For example, the computer system 550 may be used in conjunction with the handset 20 and the application logic module 175 for generating and updating the application data structure 165 and for choosing the most appropriate access technology for any given application that executes on the handset 20. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A multi-technology handset comprising:
   a controller configured to establish a communicative coupling to a CDMA network using a CDMA radio and a second technology network using a second technology radio in response to the execution of an application on the handset;
   a memory module containing an application data structure associated with the application, wherein the data structure comprises one or more previously taken measurements of the performance of the application using the CDMA network and the second technology network; and
   an application logic module configured to determine a ranking of the CDMA network and the second technology network for the application using the data structure, to send an instruction to the controller to complete the communicative coupling to the CDMA network or the second technology network based on the ranking, and to perform an update on the data structure based upon the running of the application.

2. The multi-technology handset of claim 1 wherein the second technology comprises a wireless fidelity (WiFi) technology, a worldwide interoperability for microwave access (WiMAX) technology, or a global system for mobile communications (GSM) technology.

3. The multi-technology handset of claim 1 wherein the data structure comprises a network bandwidth the application requires, a cost involved with the CDMA network and the second technology network, a reliability of the CDMA network and the second technology network, a duration of usage, a frequency of usage, a prior user behavior, a prior handset behavior, or an availability of the CDMA network and the second technology network.

4. The multi-technology handset of claim 1 wherein the instruction is configured to cause the controller to complete the communicative coupling with the second technology network if it is ranked highest and to complete the communicative coupling with the CDMA network if the second technology network is not available.

5. The multi-technology handset of claim 1 wherein the instruction is configured to cause the controller to complete the communicative coupling with the CDMA network if it is ranked highest and to complete the communicative coupling with the second technology network if the CDMA network is not available.

6. The multi-technology handset of claim 1 further comprising a fault count module configured to increment a fault count in the data structure if a fault occurs with respect to the CDMA network or the second technology network.

7. The multi-technology handset of claim 1 wherein when the application logic module determines a ranking for the application using the data structure, a user can override the ranking for a single event with respect to the application.

8. The multi-technology handset of claim 1 wherein when the application logic module determines a ranking for the application using the data structure, a user can override the ranking for all events with respect to the application.

9. The multi-technology handset of claim 1 wherein the data structure associated with the application is in the form of a table or a list.

10. The multi-technology handset of claim 1 wherein the data structure comprises a resource usage with respect to the CDMA network and the second technology network and wherein the application logic module sends the instruction to the controller to complete the communicative coupling to the CDMA network or the second technology network based on whether the data structure indicates that either the CDMA network or the second technology network is currently being used.

11. A method for determining a preferred access technology for a multi-technology handset, comprising:
   initializing an application;
   determining a highest ranked access technology network for the application based, at least in part, on an application data structure associated with the application;
   determining a second highest ranked access technology network for the application, based, at least in part, on the application data structure, wherein the application data structure comprises one or more previously taken measurements of the performance of the highest and second highest ranked access technology networks for the application;
   attempting to acquire the highest ranked access technology network;
   running the application; and
   updating the application data structure associated with the application based on the step of running.

12. The method of claim 11 further comprising attempting to acquire the second highest ranked access technology network if the highest ranked access technology network cannot be acquired.

13. The method of claim 11 wherein the step of updating further comprises storing a cost involved with the highest ranked access technology network.

14. The method of claim 11 wherein the step of updating further comprises storing a reliability associated with the highest ranked access technology network.

15. The method of claim 11 wherein the step of updating further comprises storing a duration of usage associated with the highest ranked access technology network.

16. The method of claim 11 wherein the step of updating further comprises storing a frequency of usage associated with the highest ranked access technology network.

17. The method of claim 11 wherein the step of updating further comprises storing a bandwidth associated with the highest ranked access technology network.

18. The method of claim 11 wherein the step of updating further comprises:
   determining if a fault occurs with respect to the highest ranked access technology network;
   incrementing a fault counter; and
   storing data associated with the incremented fault counter in the application data structure.

19. A multi-technology handset comprising:
   a controller configured to establish a communicative coupling to a first technology network using a first technology radio and a second technology network using a second technology radio in response to the execution of an application on the handset;
   a memory module containing an application data structure associated with the application, wherein the data structure comprises one or more previously taken measurements of the performance of the application using the first and second technology networks; and
   an application logic module configured to determine a ranking of the first and second technology networks for the application using the data structure, to send an instruction to the controller to complete the communicative coupling to the first or second technology network based, at least in part, on the ranking, and to perform an update on the data structure based upon the running of the application, wherein the update comprises modifying en one or more previously taken measurements based on measurements taken during the running of the application.

20. The multi-technology handset of claim 19, wherein the application data structure further comprises input received from a user about the performance of the application using the first and second technology networks.

* * * * *